Fred T. Roberts,
Robert E. Roberts,
INVENTORS

April 3, 1962

F. T. ROBERTS ET AL 3,028,291

METHOD OF MAKING SPIRALLY CORRUGATED
REINFORCED FLEXIBLE HOSE

Filed Aug. 26, 1959

Fred T. Roberts,
Robert E. Roberts,
*INVENTORS*

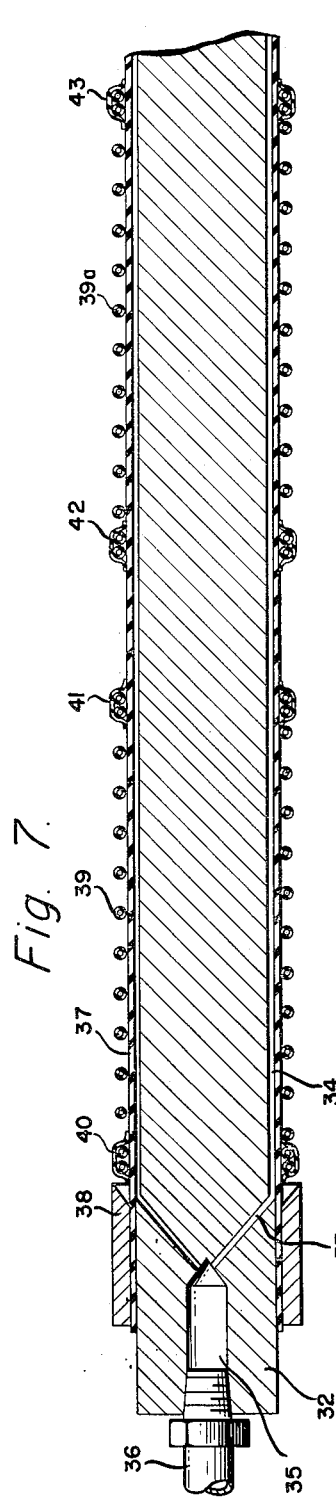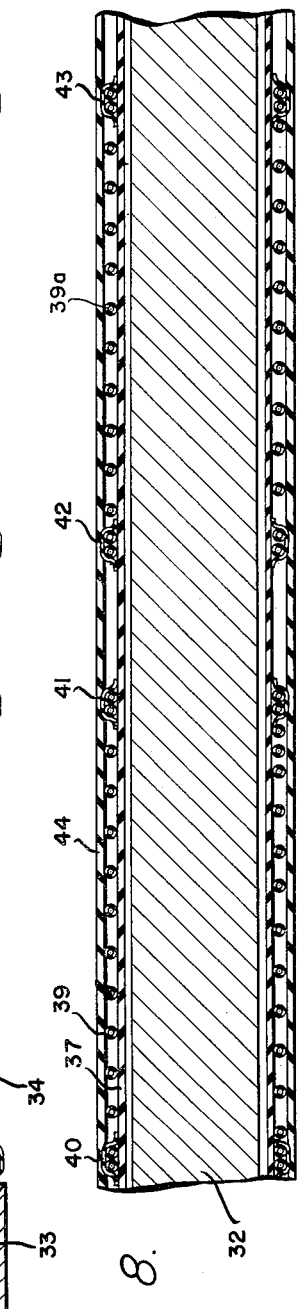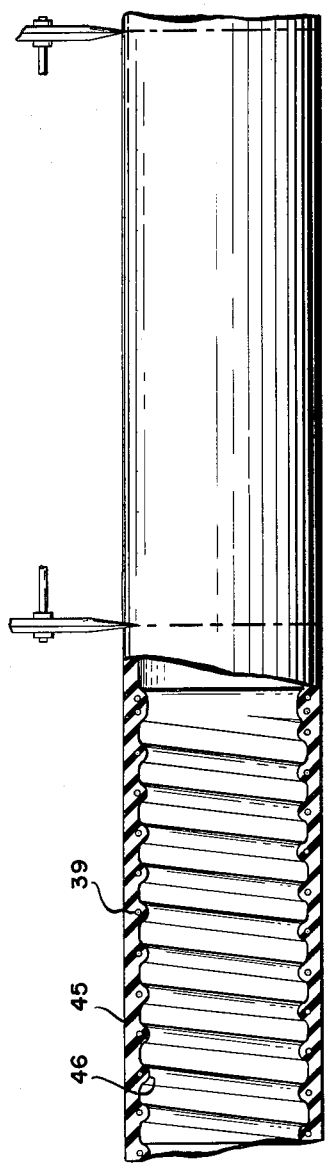
Fred T. Roberts,
Robert E. Roberts,
INVENTORS.

April 3, 1962
F. T. ROBERTS ET AL
3,028,291
METHOD OF MAKING SPIRALLY CORRUGATED
REINFORCED FLEXIBLE HOSE
Filed Aug. 26, 1959
5 Sheets-Sheet 4
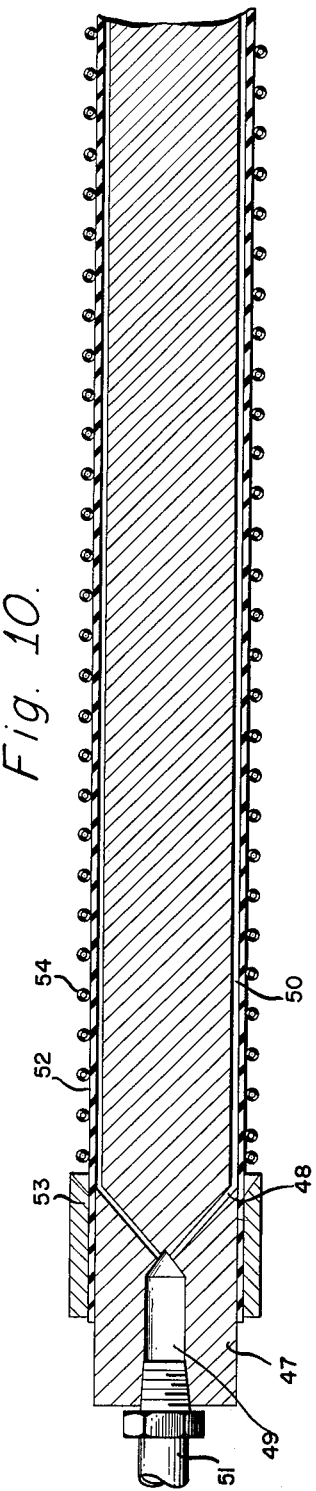
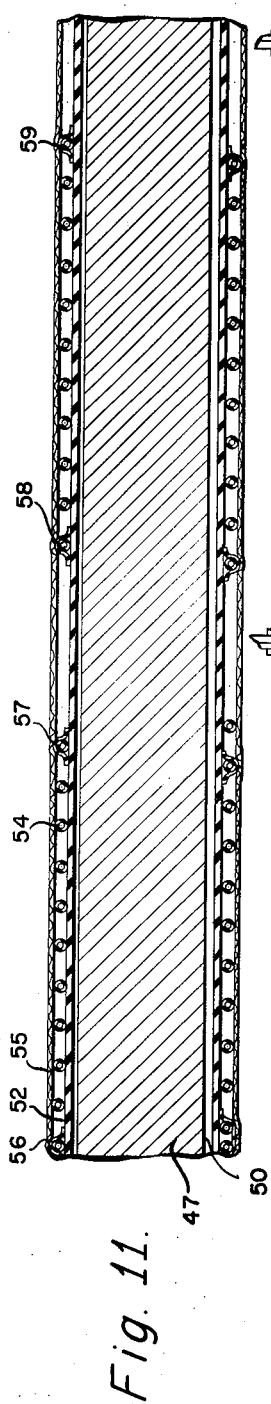
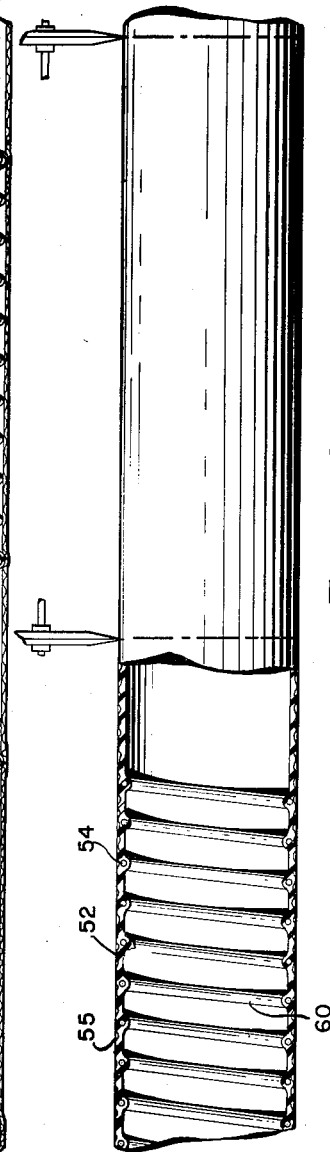
Fred T. Roberts,
Robert E. Roberts,
INVENTORS April 3, 1962    F. T. ROBERTS ET AL    3,028,291
METHOD OF MAKING SPIRALLY CORRUGATED
REINFORCED FLEXIBLE HOSE
Filed Aug. 26, 1959      5 Sheets-Sheet 5
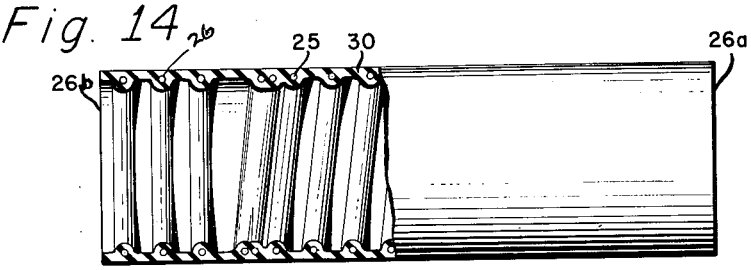
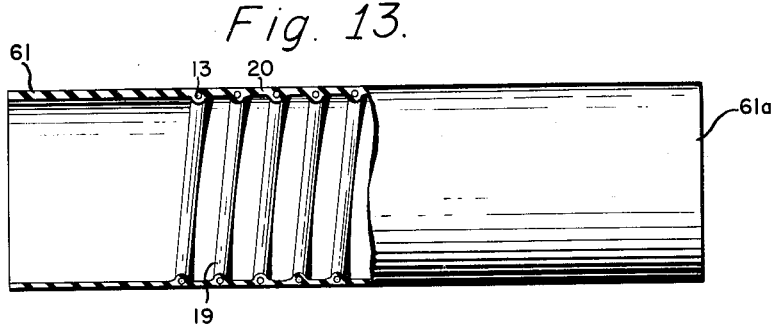
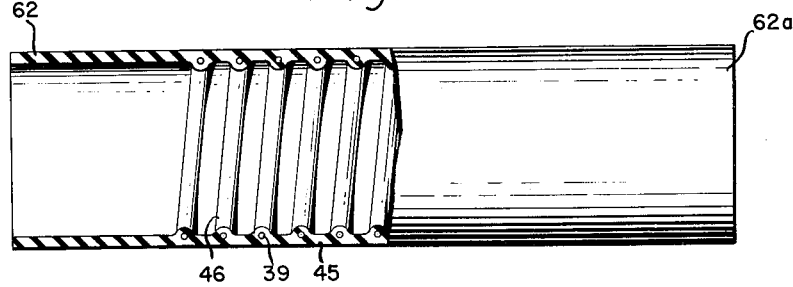
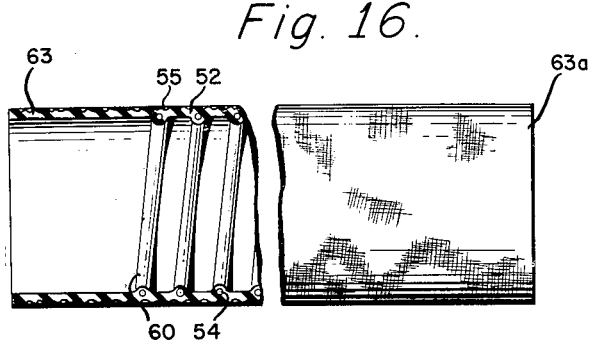
Fred T. Roberts,
Robert E. Roberts,
*INVENTORS.*

United States Patent Office 3,028,291
Patented Apr. 3, 1962

3,028,291
METHOD OF MAKING SPIRALLY CORRUGATED REINFORCED FLEXIBLE HOSE
Fred T. Roberts and Robert E. Roberts, both of White Fences, Danbury Road, Wilton, Conn.
Filed Aug. 26, 1959, Ser. No. 836,847
11 Claims. (Cl. 156—143)

The present invention relates to an internally corrugated hose formed of or comprising elastomeric material, such as rubber, synthetic rubber, or the like, said hose having a smooth external surface and being provided with internal corrugations. More particularly, this invention relates to a hose which is capable of being formed in either short or long lengths and either in a semi-cured or finally cured state. Still more particularly, it relates to the severing of the long lengths of hose to form a plurality of separate and individual shorter lengths of hose, each provided with a helical reinforcing member embedded therein and formed with end collars for attachment or clamping to fittings, or the like. The invention is further concerned with a method for the manufacture of hose by first forming a hose in such short or longer lengths and in such manner that they may be either partially cured or finally cured, and severed, if desired, at a plurality of points in order to form individual hose members.

The present application is a continuation-in-part of applicants' copending application Serial No. 720,260, filed March 10, 1958, now abandoned, said application being a continuation-in-part of application Serial No. 621,093, filed November 8, 1956, now Patent No. 2,830,622. In said patent an elongate hose member is formed with a smooth, molded outer surface and with a plurality of annular and/or spiral reinforcements disposed therein and molded in predetermined spaced relation, so that hose sections of desired length can be formed by severing the elongate member between the reinforcement as required, after the longer hose body has been molded in such a manner that such a smooth surface and such internal corrugations are obtained. As described in the aforesaid patent, the hose is formed by a novel method wherein a body of elastomeric material, preferably in tubular or sleeve form, is disposed on a mandrel on which it may be expanded. The reinforcements are then located on the exterior of the body and the tube preferably slightly expanded to cause the body to grip the reinforcements and hold them in place. Thereafter, the assembly is introduced into a straight cylindrical mold and the tubular body is expanded under pressure while at the same time applying curing heat thereto, with the result that the tube is forced around the reinforcements and into engagement with the inner surface of the mold, thereafter being caused to become set or vulcanized in this position, with the result that a smooth surfaced, internally corrugated hose body is obtained in which the reinforcements are embedded. A generally similar method is utilized in practicing the invention described herein and in our copending application, and in the production of the novel hose construction referred to.

In accordance with the present invention, an elongated mandrel of the desired length may be utilized and an elongated hose body formed thereon by positioning a tubular layer of elastomeric material on the mandrel, positioning either a single reinforcing member or a plurality of reinforcing members thereover, said reinforcing means being in the form of spaced helical convolutions so positioned that unreinforced spaces are formed, the elongated body being thereafter partially or finally cured in a mold so that an elongated tubular member is obtained. In the event a plurality of helical reinforcements is employed, they are embedded in such manner that the hose either partially cured or fully cured can be severed at points intermediate the areas where reinforcements have been omitted, thereby providing a plurality of lengths of hose having unreinforced end collars. The partially cured hose, for instance, may then be curved in shape as desired and thereafter finally cured in the predetermined curved shape.

While the invention will be described with particular reference to elongated internally corrugated fully cured hose which may be severed, the principles described apply with equal force to partially cured internally corrugated, short or long hose which long hose for example, may be severed, if desired, and then finally curing the same in any desired shape. These principles defining a modification of the invention will not be shown. A good understanding of the invention may be had by referring to the accompanying drawings herein and their attendant description.

Other features of the invention will be apparent from the specification and claims when considered in connection with the drawings, in which:

FIG. 7 is a longitudinal cross section view illustrating a further modification of the invention in an initial stage of production.

FIG. 8 is a longitudinal cross sectional view illustrating a later stage in the manufacture of the form of the invention illustrated in FIG. 7.

FIG. 9 is a longitudinal view partly in cross section and partly in elevation illustrating the finished product produced according to FIGS. 7 and 8, preparatory to being cut into individual sections.

FIG. 10 is a longitudinal cross section view illustrating the initial stage of production of a further modification of the invention.

FIG. 11 is a longitudinal cross section view illustrating a further stage of production of the product illustrated in FIG. 10.

FIG. 12 is a longitudinal view partly in cross section and partly in elevation illustrating the finished product produced in accordance with FIGS. 10 and 11, preparatory to being cut into segments.

FIG. 13 is a longitudinal view partly in cross section and partly in elevation illustrating a completed hose segment produced in accordance with the method illustrated in FIGS. 1 and 4.

FIG. 14 is a longitudinal view partly in cross section and partly in elevation illustrating the structure of a completed hose segment produced in accordance with FIGS. 5 and 6.

FIG. 15 is a longitudinal view partly in cross sectoin and partly in elevation illustrating the construction of individual hose segments produced in accordance with the method illustrated in FIGS. 7, 8 and 9.

FIG. 16 is a longitudinal view partly in cross section and partly in elevation illustrating the structure of an individual hose member produced in accordance with the method illustrated in FIGS. 10, 11 and 12.

Figure 1:
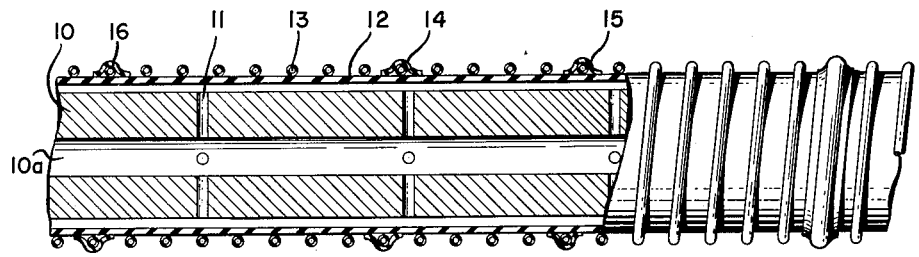
FIGURE 1 is a longitudinal view partly in elevation and partly in cross section illustrating the assembly of the hose elements in an early stage of production of the hose.
Figure 2:
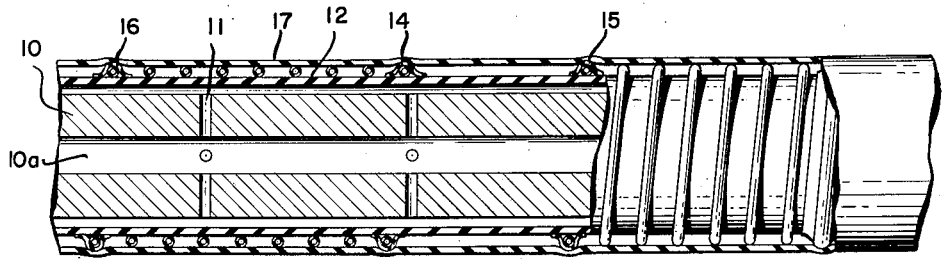
FIG. 2 is a longitudinal view partly in elevation and partly in cross section illustrating a further stage in the production of the hose.

In accordance with the form of the invention illustrated in FIGS. 1 to 4, inclusive, a mandrel 10 of suitable length and diameter is provided. This mandrel is formed with a central bore 10a from which channels 11 extend radially to the surface of the mandrel. A sufficient number of such channels is provided to permit the access of fluid introduced through the bore so that uniform distribution of such fluid over the surface of the mandrel may take place. Over the mandrel is drawn or positioned a tubular elastomeric layer 12, which may preferably be formed by extrustion prior to being positioned over the mandrel, but may be applied in the form of a sheet with overlapping joints, or in any other suitable manner. This tubular layer is preferably composed of a vulcanizable rubber or synthetic rubber compound but may also be of other suitable elastomeric plastic material, such as polyvinyl chloride. Over this tubular layer is positioned a reinforcing member 13 which is composed of spaced helical turns extending longitudinally over the surface of the tube. This helical reinforcing member is preferably in the form of a wire spring member which may be preformed with its convolutions spaced in the desired manner, or the reinforcing member may be formed with its convolutions closely coiled, then positioned over the tubular layer and drawn apart with its ends taped down so that the convolutions will become spaced as desired. The reinforcing member may also be applied by winding a spring wire member around the tubular layer over the mandrel in a spaced helical pattern. The reinforcing member may be formed of bare wire or precoated with a layer of elastomeric material which is compatible with the material of the tube, as shown. Such coating may be of rubber, synthetic rubber, or of plastic, such as a polyvinyl chloride composition. After the reinforcing member has been positioned over the tube, strips of tape, as shown at 14, 15 and 16, for example, are applied over predetermined turns of said reinforcement, the spacing of such tape being such that separate lengths of hose will be defined, or, in other words, the taping will correspond to the length of reinforcement which is desired in one or more lengths of hose which are to be obtained from the final assembly. In this way a plurality of lengths of hose of the same or different length may be defined along the length of the single assembly. As shown in FIG. 2, the convolutions of the reinforcing member between tape strips 14 and 15 have been removed by cutting them out using a wire cutter or the like, thus leaving the area between these taped portions free of reinforcement. The same procedure is applied to corresponding taped areas between desired hose segments, since these areas are intended to represent the ends or collars of the final tubes or hose lengths and which are intended to be free of these reinforcing means. At this point, if desired, a second layer 17 of elastomeric material or fabric, or rubber coated or impregnated fabric, may be applied over the connecting ends or collar portions to thicken and reinforce them, and may also be applied over the reinforcing members, as shown. However, this additional layer may not be necessary over the reinforcements but it is desirable where an additional layer of material or fabric reinforcement is desired in the final product, for strength.

Figure 3:
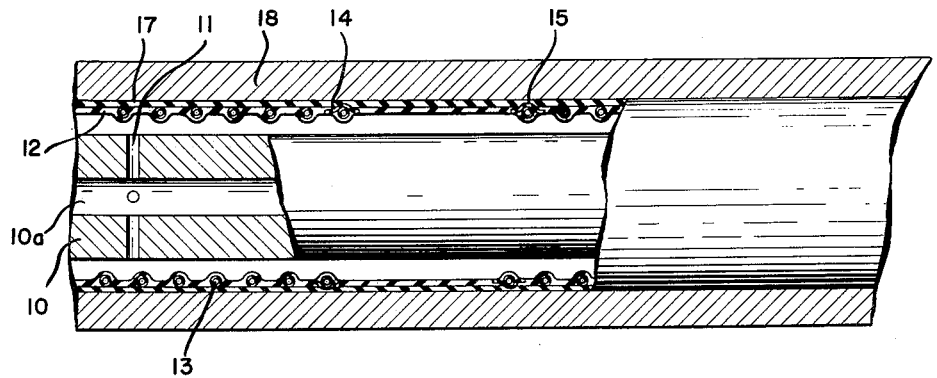
FIG. 3 is a view partly in elevation and partly in cross section illustrating the molding operation utilized in the production of the finally-cured hose.
Figure 4:
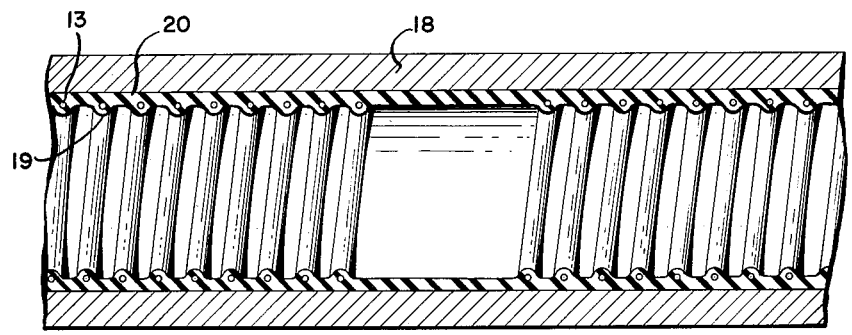
FIG. 4 is a longitudinal cross section view illustrating the hose produced in accordance with FIGS. 1 to 3 positioned in the mold prior to removal therefrom.

As shown in FIG. 3, the assembly of FIG. 2 is introduced into a cylindrical mold 18, which may be in the form of a hollow pipe or a two-part cylindrical mold cavity. As shown in FIGS. 1 and 2, the inner tube is spaced slightly from the mandrel by the application of a slight degree of pressure, which is for the purpose of forcing the engagement of the tube with the reinforcement in order to hold such reinforcement in position. In FIG. 3 the position of the tubular assembly is shown as it is forced firmly against the inner surface of the mold by the application of additional internal fluid pressure, this figure thus illustrating the structure of the hose prior to its final cure. Upon the continued application of heat and pressure sufficient to effect curing and coalescense of the respective layers of the assembly, the product shown in FIG. 4 is obtained. In the case of a vulcanizable rubber or synthetic rubber compound, temperatures in the range of about 250 to 350 degrees F. and pressures ranging from a few pounds to about 30 p.s.i. may be utilized. This figure shows reinforcement 13 embedded within composite tubular layer 20 and corresponding corrugations which are formed as the result of the forcing of the material around the reinforcing member and into engagement with the inner surface of the mold shown at 19.

Figure 5:
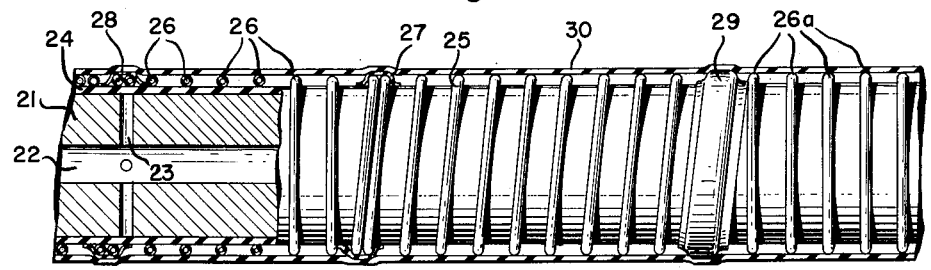
FIG. 5 is a longitudinal view partly in cross section and partly in elevation illustrating a modified form of the invention in an initial stage of manufacture.
Figure 6:
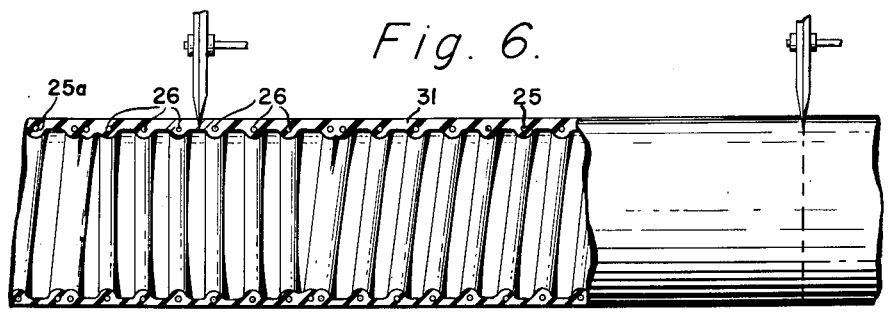
FIG. 6 is a longitudinal view partly in cross section and partly in elevation illustrating a finished product produced according to FIG. 5 prior to being cut in segments.

In the modified form of the invention illustrated in FIGS. 5 and 6, a mandrel 21 is provided with an internal bore 22 and a plurality of radial passages 23 communicating with the surface of the mandrel. Over the surface of the mandrel is applied a tubular layer 24 of elastomeric material and thereover is positioned a plurality of reinforcing members 25 in the form of spaced helices or spring members of predetermined length, the ends of which are taped down, as shown at 27 and 29, for example. Along the mandrel at spaced intervals are positioned additional helical reinforcing members with spaces therebetween, the ends of which are also taped down, as shown, for example, at 28. The space between adjacent spring members is occupied by a plurality of spaced annular ring-type reinforcing members which are preferably slightly expansible by having open ends and having the structure illustrated in applicants' U.S. Patent 2,830,622. These ring members 26 are positioned between the taped area defined by 27 and 28, and by 26a positioned between taped area 29 and the next adjacent spring member, which is not shown. Over these reinforcements is positioned another tubular layer 30 which may also be of elastomeric material or of rubber and fabric, if desired. This assembly is then introduced into a mold in the manner similar to that illustrated in FIG. 3 and the tubular layers forced outward against the inner surface of the mold by the application of heat and pressure by means of fluid introduced through bore 22 and channel 23, with the result that the reinforcing members become integrally embedded, resulting in the product shown in FIG. 6. This product is a composite elongated hose member in which spaced helical reinforcing members 25 and 25a are embedded within tubular body 30, with the areas between the spaced helical reinforcements being occupied by spaced annular rings 26. By cutting inbetween or intermediate the spaced helical reinforcing members, preferably between adjacent reinforcing rings, at the points indicated in FIG. 6, a plurality of hose segments is obtained each of which is composed of intermediate continuous helical reinforcing members together with end ring reinforcing members positioned at the point where they will serve to reinforce the collar portion of the tube when it is attached or clamped to a fitting.

In accordance with the further modified form of the invention illustrated in FIGS. 7, 8 and 9, mandrel 32 is provided in which annular channels 33 which communicate with a plurality of longitudinal shallow surface channels 34 which are spaced around the circumference of the mandrel communicating, in turn, with opening 35 to which is connected fitting 36 for the introduction of fluid under pressure. Over this mandrel is positioned a tubular layer 37 of elastomeric material. A plurality of separate helical reinforcing members, as shown at 39 and 39a, are positioned over the tubular layer and are arranged so that they are spaced from each other with their ends taped down to the tube, as shown at 40, 41, 42 and 43, by means of rubber or fabric tape. The use of separate spaced reinforcing coils distinguishes from the use of a single elongated reinforcing member, such as shown in FIGS. 1 and 2, and avoids the necessity of cutting out unnecessary intermediate convolutions. The end areas of the tubular layer are clamped to the mandrel by means of the clamping ring 38, as shown. As illustrated in FIG. 8, an additional layer of elastomeric material, or fabric coated with such material, may be applied over the reinforcements and connecting portions. The assembly may then be introduced into a mold such as illustrated in FIG. 3, and the tubular layers are expanded against the inner surface of the mold by the application of heat and internal fluid pressure, with the result that the layers will be united with the reinforcing means embedded therein. The product is shown in FIG. 9, in which the reinforcements 39 are embedded within the resulting composite tube 45 and within corrugations 46 formed internally of the tube as the material is forced around the convolutions of the reinforcement during molding.

In the alternative form of the invention illustrated in FIGS. 10 and 11 and 12, a mandrel 47 of the type described in connection with FIG. 7 is utilized. This mandrel is provided with channels 48 communicating with opening 49 and hollow surface channels 50. Fluid under pressure is supplied through fitting 50. An elastomeric tube 52 formed of a vulcanizable composition is applied over the mandrel and over this is positioned an elongated reinforcing member 54 in the form of spaced convolutions of a spring member coated with elastomeric material. The tube is held against the mandrel by means of a clamping ring 53, a similar ring being positioned at the opposite end of the mandrel. As shown in FIG. 10, the spring is taped to the tube by tapes 56, 57, 58 and 59 spaced to define the reinforced areas of the desired lengths of hose, the area between 57 and 58 being made non-reinforced by cutting out the undesired convolutions after taping. The tape may be of uncured rubber strips, or fabric impregnated or coated with uncured rubber. In FIG. 11, a layer of fabric 55 is positioned over the reinforcement. This fabric may be of an open mesh or closed mesh variety and may be stretchable, or not, as may be desired. The fabric is also clamped beneath the rings 53. The assembly is positioned within a mold of the type described in connection with FIG. 3 and the assembly expanded by introducing air or stream under pressure through the opening and channels, thus forcing the tubular layer outwardly against the mold. At the same time heat is applied, either by introducing the mold into a heated chamber or between heated platens of a press, or by using heated air or steam, or both. Sufficient heat is applied to cure or vulcanize the material, at the same time causing it to flow around and become bonded to the reinforcement and bond or embed the fabric adjacent the surface thereof. Temperature of 250 to 350 degrees F. for a period of 15 minutes to 25 minutes at a pressure of five to 30 p.s.i. are generally sufficient to effect a total cure. The resulting product, removed from the mold after the cure and cooling, is shown in FIG. 12 in which fabric 55 is embedded at the surface of tubular layer 52 and inner corrugations 60 are formed when the tube is forced outwardly against the mold around reinforcement 54. The individual hose bodies are obtained by cutting at the points indicated.

The respective final products obtained in accordance with the above procedure are illustrated in FIGS. 13, 14, 15 and 16. As shown in FIG. 13, a relatively short length of hose is formed by the method illustrated in FIGS. 1 to 4, in which a coiled helical reinforcement 13 is embedded in tube 20, with corrugations 19 being formed internally of the tube. End collars or sleeves 61 and 61a are formed as the result of cutting the elongated molded body at points intermediate the non-reinforced areas of the tube, as shown in FIG. 4.

In FIG. 14 is illustrated a short individual hose length produced according to the method illustrated in FIGS. 5 and 6. The resulting product has a tubular body portion 30 having embedded therein a coiled helix 25 and with end collar areas 26a and 26b containing annular rings 26 embedded therein. In this way additional reinforcement is provided when the collars are clamped against fittings, particularly since the inner ribs formed by the elastomeric material surrounding the rings provide additional sealing and clamping members.

FIG. 15 shows the structure of individual short lengths of hose produced according to the method illustrated in FIGS. 7, 8 and 9. Tubular elastomeric body 45 has embedded therein helical reinforcement 39 and is formed with inner corrugations 46. End collars 62 and 62a have been formed by cutting through unreinforced areas between reinforcing members, as described above.

FIG. 16 shows the structure of individual short lengths of hose produced by the method illustrated in FIGS. 10, 11 and 12. Body portion 52 contains embedded therein helical reinforcement 54 and fabric layer 55 embedded in or adjacent to the surface. Inner corrugations 60 are formed during molding. End collars 63 and 63a are formed by cutting in the manner illustrated in FIG. 12.

In order to provide additional strength in the collar areas, particularly where the tubular body is relatively thin walled, sleeves or rings of elastomeric material may be applied under or over the tubular body in the area where the collars are to be formed. By way of example, an extra layer of rubber, or the like, may be applied as a strip or as tape over the tube before applying the reinforcement, thus giving additional thickness in these areas when this layer becomes united during the molding step.

As previously stated above in connection with the description of the drawings, the hose may be formed in any predetermined length, by placing over a mandrel an elastomeric tube, and placing thereon a single helical reinforcing member or a plurality of the same spaced at predetermined intervals, attaching the reinforcing means on the tube, then expanding the tube against the reinforcing means by internal fluid pressure thus causing expansion of the tube against the reinforcing means, releasing the internal fluid pressure to permit removal of the reinforced tube from the mandrel placing the reinforced tube in a suitable mold and partially curing the same. The partial or semi-cure of the tube is, in general, accomplished at the above-recited vulcanization temperatures, namely, between about 250° F. and 350° F. and at a pressure of from 5–30 p.s.i. for a period not to exceed 5 to 10 minutes. Where longer times are employed, total or complete vulcanization is realized. It is an advantage of the present invention that such total cure-up can be avoided and that the semi-cured product can be molded at a subsequent time into any curved shape desired. Thus, after partial cure is effected, the semi-cured reinforced tube can be placed in a curved cylindrical mold which may be cylindrical in shape, or a jig of any other curvature as for example a right-angled jig which may be fitted with two hollow plugs located on the vertical and horizontal respectively, over which each end of the semi-cured hose is placed. The jig is then placed in an oven maintained at the aforementioned temperatures and pressures, for at least an additional five to 10 minutes to effect a final cure of the hose in curved form. The time for vulcanization depends, of course, in large measure to the particular elastomer employed. Further, where a plurality of reinforcing members are used in a tube such tube may be severed after partial vulcanization, or before any vulcanization, and resultant shorter length hose can be shaped and cured as desired.

While the present invention has been described in connection with certain specific embodiments thereof, it is to be understood that these are for the purpose of illustration only and in no way limit the scope of the invention which is defined by the appended claims.

*Embodiment of the Invention*

It is preferred to first form the assembled tube with wire reinforcements spaced on the outer surface of the tube and with or without a reinforcement of fabric or an additional layer of elastomeric material over the wire reinforcements and adhering to the surface of the tube inbetween the wire reinforcements and extending over the collar areas to thicken that portion of the hose as well as intermediate wire reinforced portion of the hose, and then semi-cure the assembled hose in a cylindrical mold cavity of larger diameter than the assembled hose body.

The cylindrical mold cavity may be, and preferably is, straight. The cylindrical cavity mold may also be of any desired curvature and the formed hose immediately after being formed may be placed in the curved mold and semi-cured therein. The latter hose body is removed. The completion of the cure is accomplished by holding the curved semi-cured hose on a jig.

The use of the straight cylindrical mold to obtain both a semi-cure of the hose and a final cure on a jig have the advantage of requiring less mold equipment and by permitting the use of jigs instead of curved molds.

We claim:

1. A method for the manufacture of spirally currugated reinforced flexible hose which comprises forming an elongated tubular member of elastomeric material, forming an assembly by positioning over said member a plurality of separate longitudinally spaced reinforcing members each of which comprises a plurality of longitudinally spaced helical wire turns, each of said reinforcing members being spaced from the adjacent member by a predetermined distance corresponding to end collars of individual lengths of hose to be cut from said elongated member, positioning said tubular member and its superimposed reinforcement within a mold having a smooth cylindrical molding surface, expanding said tubular layer within said mold under heat and internal fluid pressure and causing said elastomeric material to flow around said reinforcing turns and into conformity with the inner surface of said mold to cause said turns to become embedded in said elastomeric material while at the same time forming inner corrugations corresponding to the convolutions of the helical turns and a smooth molded cylindrical outer surface, continuing the application of heat and internal fluid pressure until the desired curing of the elastomeric material is effected, removing the elongated assembly from the mold, and cutting the resulting elongated member into individual hose segments at points intermediate the spaced reinforcing members.

2. A method for the manufacture of flexible hose according to claim 1 which comprises superimposing a second tubular member over the reinforcing members prior to introducing the assembly into the mold.

3. A method according to claim 2 wherein the second tubular member is composed of elastomeric material.

4. A method according to claim 2 wherein the second tubular member is composed of fabric.

5. A method according to claim 1 wherein the elastomeric material is a vulcanizable rubber compound.

6. The method according to claim 1 wherein annular rings are positioned in a spaced manner between the spaced helical reinforcements.

7. The method for the manufacture of flexible hose according to claim 1 wherein the reinforcing members are applied in the form of separate spaced coils the end convolutions of which are taped to the tubular member and spaced to define collar areas therein.

8. The method for the manufacture of flexible hose according to claim 1 wherein an elongated, coiled helical member is applied to extend substantially the full length of the tubular member and is taped thereto at its ends and at intermediate points defining the length of the desired reinforcements, and thereafter the convolutions between said intermediate points are removed to define the collar areas of the final hose members.

9. The method for the manufacture of flexible hose which comprises positioning a tubular layer of elastomeric material over an elongated mandrel having openings therein for the admission of fluid under pressure to the surface thereof, positioning over the surface of said tubular layer a plurality of coiled helical reinforcing wire members, each of which is longitudinally spaced from an adjacent member and each of which comprises a plurality of longitudinally spaced helices, maintaining said reinforcing members in a predetermined spaced apart relationship to define collar areas, positioning the mandrel with its tubular layer and reinforcing members thereover within a cylindrical mold, introducing fluid under pressure through said mandrel and into the interior of said tubular layer thereby forcing it outwardly against the surface of the mold and simultaneously subjecting said elastomeric material to the effects of heat causing it to flow around said reinforcing member and into contact with the surface of the mold to form an elongated member, continuing the application of heat and internal fluid pressure until curing of the elastomeric material to the desired degree is effected, removing the elongated member from the mold, and forming the elongated member into separate hose segments by cutting between the spaced reinforming members to define a plurality of separate flexible hose members each of which is provided with collar areas.

10. A method for the manufacture of spirally corrugated reinforced flexible hose which comprises forming a tubular member of elastomeric material, positioning over said member a longitudinally spaced reinforcing member comprising a plurality of longitudinally spaced helical wire turns to form an assembly, positioning said tubular member and its superimposed reinforcing members in a mold, semi-curing the tubular assembly under heat and internal fluid pressure to cause flow of said elastomeric material around said wire turns, removing the assembly from the mold, shaping the semi-cured tubular assembly to form an individual shaped hose, and thereafter completely curing the individual shaped hose.

11. A method for the manufacture of spirally corrugated reinforced flexible hose which comprises: forming an elongated tubular member of elastomeric material, positioning over said member a plurality of separate longitudinally spaced reinforcing members each of which comprises a plurality of longitudinally spaced helical wire turns to form an assembly, each of said reinforcing members being spaced from the adjacent member by a predetermined distance corresponding to end collars of individual lengths of hose to be cut from said elongated assembly, positioning said tubular assembly and its superimposed reinforcing members in a mold, semi-curing the tubular assembly under heat and internal fluid pressure causing said elastomeric material to flow around said wire turns, removing the semi-cured assembly from the mold, cutting the assembly into individual hose segments at points intermediate the spaced reinforcing members, shaping, and thereafter completely curing the individual hose segments.

References Cited in the file of this patent

UNITED STATES PATENTS

| | | |
|---|---|---|
| 2,622,623 | Michaudet | Dec. 23, 1952 |
| 2,743,759 | Snow et al. | May 1, 1956 |
| 2,766,806 | Rothermel et al. | Oct. 16, 1956 |
| 2,783,819 | Duff | Mar. 5, 1957 |
| 2,830,622 | Roberts et al. | Apr. 5, 1958 |
| 2,837,121 | Roberts | June 3, 1958 |
| 2,858,854 | Daggett | Nov. 4, 1958 |
| 2,879,803 | Francois | Mar. 31, 1959 |
| 2,961,007 | Martin | Nov. 22, 1960 |

UNITED STATES PATENT OFFICE
CERTIFICATE OF CORRECTION

Patent No. 3,028,291

April 3, 1962

Fred T. Roberts et al.

It is hereby certified that error appears in the above numbered patent requiring correction and that the said Letters Patent should read as corrected below.

Column 2, line 68, for "sectoin" read -- section --; column 5, line 42, for "stream" read -- steam --; column 7, line 20, for "currugated" read -- corrugated --; column 8, line 25, for "reinforming" read -- reinforcing --.

Signed and sealed this 24th day of July 1962.

(SEAL)
Attest:

ERNEST W. SWIDER
Attesting Officer

DAVID L. LADD
Commissioner of Patents